US005288576A

United States Patent [19]

Miyamoto et al.

[11] Patent Number: 5,288,576

[45] Date of Patent: Feb. 22, 1994

[54] ELECTROPHOTOGRAPHIC MEMBER HAVING AN AZO COMPOUND WITH DIPHENOQUINONE

[75] Inventors: Eiichi Miyamoto, Osaka; Yasuyuki Hanatani, Sakai; Hiroaki Iwasaki, Hirakata; Yasufumi Mizuta, Kishiwada; Akihiko Kawahara, Osaka, all of Japan

[73] Assignee: Mita Industrial Co., Ltd., Osaka, Japan

[21] Appl. No.: 980,641

[22] Filed: Nov. 24, 1992

[30] Foreign Application Priority Data

Nov. 27, 1991 [JP] Japan ........................ 3-311143

Nov. 28, 1991 [JP] Japan ........................ 3-312895

[51] Int. Cl.[5] .................. G03G 5/06; G03G 5/047

[52] U.S. Cl. .................. 430/58; 430/59; 430/72; 430/83

[58] Field of Search .................. 430/58, 59, 72, 83

[56] References Cited

U.S. PATENT DOCUMENTS 3,898,084 8/1975 Champ et al. .................. 430/58
4,507,471 3/1985 Ohta .................. 534/755
5,168,026 12/1992 Miyamoto .................. 430/73

FOREIGN PATENT DOCUMENTS 0495110 7/1992 European Pat. Off. .
47-37543 12/1972 Japan .
3-256050 11/1991 Japan .

OTHER PUBLICATIONS

PCT Publ. No. WO91/19768, Dec. 26, 1991.

*Primary Examiner*—Roland Martin
*Attorney, Agent, or Firm*—Renner, Otto, Boisselle & Sklar

[57] ABSTRACT

An azo compound represented by the following general formula IA and an electrophotographic photosensitive member comprising a photosensitive layer containing the azo compound:

(IA)

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

21 Claims, 1 Drawing Sheet

102
101

104
103
102
101

103
104
102
101

ELECTROPHOTOGRAPHIC MEMBER HAVING AN AZO COMPOUND WITH DIPHENOQUINONE

BACKGROUND OF THE INVENTION

1. Field of the Invention

The present invention relates to an electrophotographic photosensitive member, and more particularly to an electrophotographic photosensitive member used in an electrostatic copying machine, a laser beam printer and the like.

2. Description of the Related Art

The so-called Carlson's process has been widely used in order to obtain copied images using an electrophotographic photosensitive member. The Carlson's process includes a charging step wherein the photosensitive member is uniformly sensitized with corona charge, an exposure step wherein the sensitized photosensitive member is subjected to exposure of an original image to form a latent image corresponding to the original image on the surface of the photosensitive member, a development step wherein the latent image is developed with a toner developer to form a toner image, a transfer step wherein the toner image is transferred onto a transfer sheet such as paper, a fixing step wherein the transferred toner image on the transfer sheet is fixed, and a cleaning step wherein the residual toner on the photosensitive member is removed.

In order to obtain a high quality copied image in the Carlson's process, it is required for the electrophotographic photosensitive member to excel in both charging characteristics and photosensitive characteristics and to be low in residual potential after exposure.

As the electrophotographic material which satisfies these requirements, there are known inorganic photoconductors of selenium, cadmium sulfide, etc. However, as for such inorganic photoconductors, there are disadvantages in that they are noxious and are of a relatively high production cost.

In view of this, instead of those noxious materials, the so-called organic electrophotographic photosensitive members prepared using organic materials have been proposed. Such an organic electrophotographic photosensitive member excels in both processability and economy, and the function thereof can be freely designed. The conventional organic electrophotographic photosensitive member has a photosensitive layer comprising a charge generating material capable of generating electric charge upon exposure and a charge transporting material capable of transporting the generated electric charge.

In order for the organic electrophotographic photosensitive member to satisfy the desired various conditions, it is necessary to appropriately select the charge generating material and the charge transporting material.

A number of various compounds have conventionally been proposed as a charge generating material including phthalocyanine compounds, perylene compounds, quinacridone compounds, anthanthrone compounds and azo compounds. Examples of the known azo compounds are disclosed in Japanese Laid-Open Patent Publication No. 47-37543 and U.S. Pat. No. 4,507,471.

However, the conventional charge generating materials have disadvantages such as a small sensitive wavelength region and insufficient light stability. As a result, the photosensitive member comprising such a charge generating material has a low sensitivity and a poor durability.

SUMMARY OF THE INVENTION

As a result of extensive studies, the present inventors found that a bias of distribution of the electron density in a charge generating material used for a photosensitive layer largely affects improvement of the charge generating efficiency and repeating stability of a photosensitive member.

Accordingly, it is possible to obtain an electrophotographic photosensitive member with advantageous characteristics such as high sensitivity and excellent durability as compared with the conventional azo compounds containing electrophotographic photosensitive member by using an azo compound having a largely biased electron density distribution as the charge generating material.

The electrophotographic photosensitive member of this invention comprises a conductive substrate and a photosensitive layer deposited on the conductive substrate, wherein the photosensitive layer comprises a charge generating material and a charge transporting material. The charge generating material comprises an azo compound having a diphenoquinone structure selected from the group consisting of structures represented by the following general formulas IA, IB, IC, IIA, IIB and IIC:

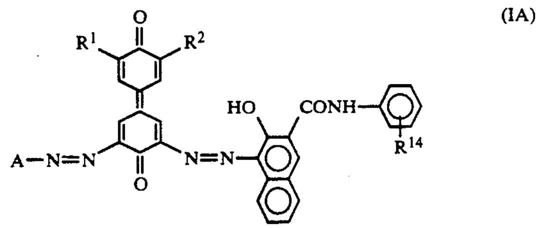

(IA)

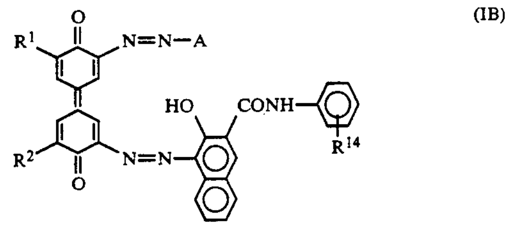

(IB)

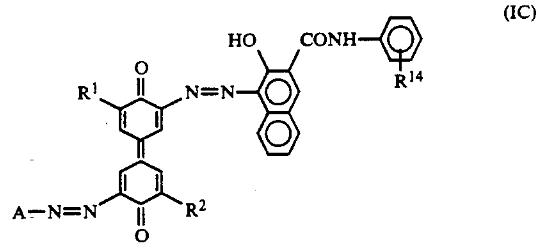

(IC)

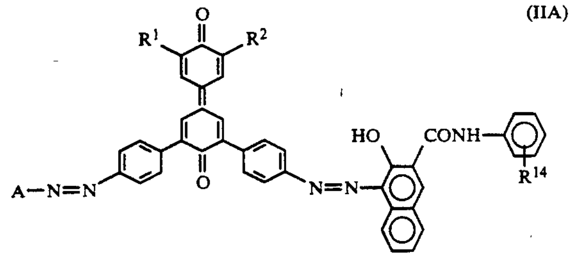

(IIA)

-continued

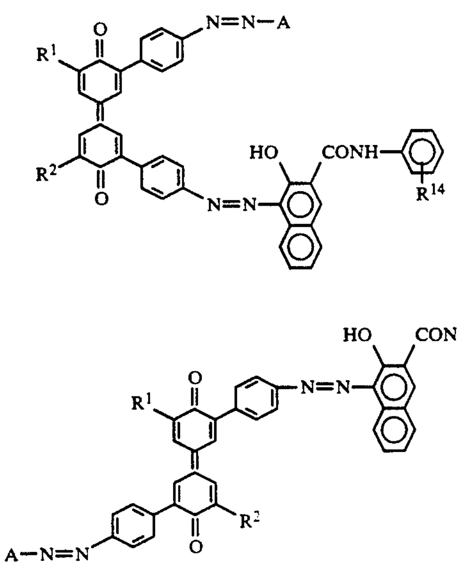

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

In another aspect, the present invention provides an azo compound represented by the following general formula IA:

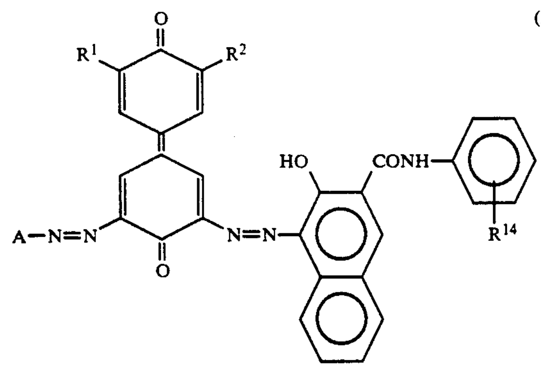

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

Alternatively, the present invention provides an azo compound represented by the following general formula IB:

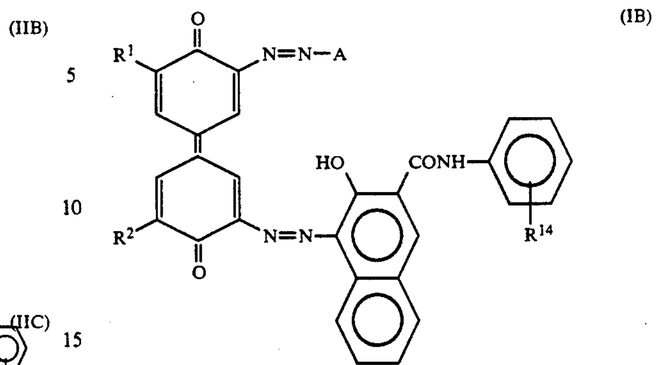

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

Moreover, the present invention provides an azo compound represented by the following general formula IC:

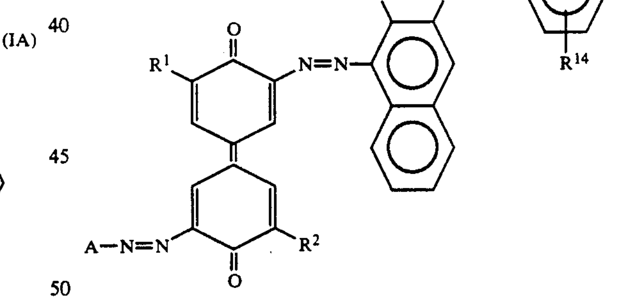

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

Alternatively, the present invention provides an azo compound represented by the following general formula IIA:

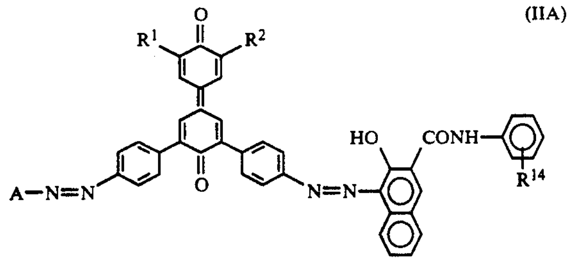

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

Alternatively, the present invention provides an azo compound represented by the following general formula IIB:

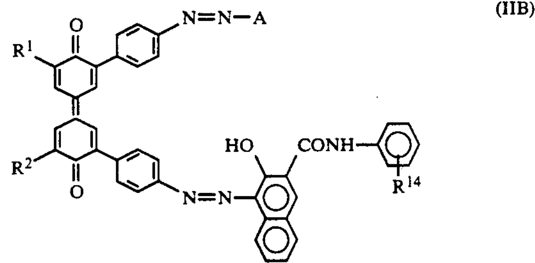

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

Alternatively, the present invention provides an azo compound represented by the following general formula IIC:

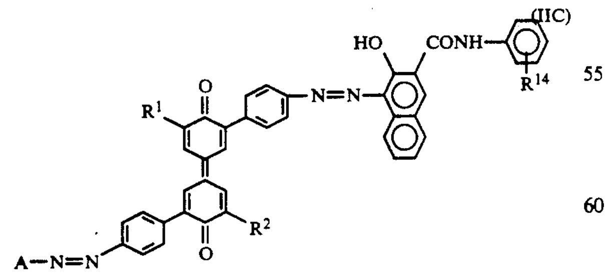

wherein $R^1$ and $R^2$ are the same or different from each other and indicate a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ indicates a hydrogen atom, a halogen group, an alkyl group, an alkoxy group, an aryl group, an amino group, a cyano group, a nitro group or a sulfoxide group; and A indicates a coupler residue having an acceptor property.

Alternatively, the present invention provides an azo compound represented by the following general formula Ia:

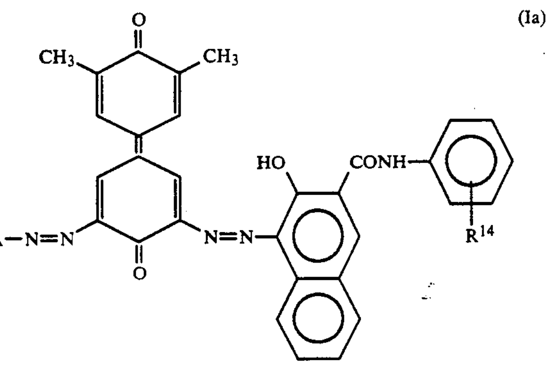

wherein A is a coupler residue represented by any of the following formulas C1, C2, C3, C4, D1, D2 and D3:

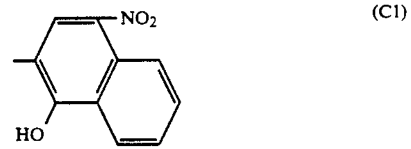

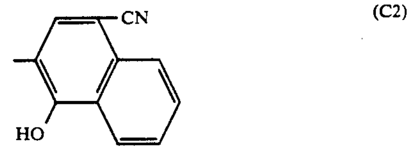

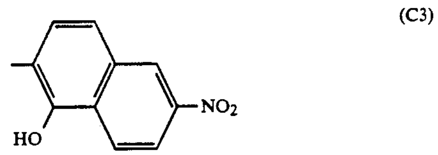

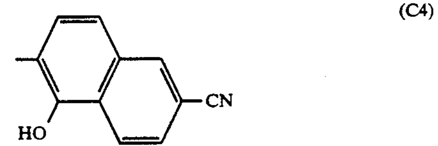

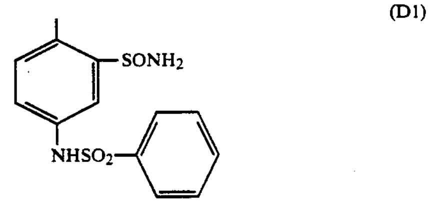

-continued (D2)

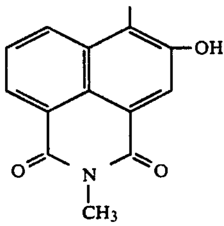

(D3)

wherein $R^{14}$ indicates a hydrogen atom, a chlorine atom at the 2-position or 3-position of a benzene ring, or a cyano atom at the 3-position of a benzene ring.

Furthermore, the present invention provides an azo compound represented by the following general formula IIa:

(IIa)

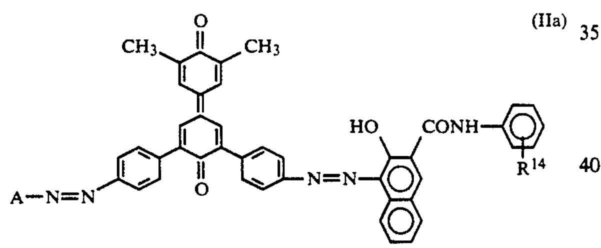

wherein A is a coupler residue represented by any of the following formulas C1, C2, C3, C4, D1, D2 and D3:

(C1)

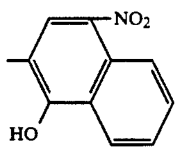

(C2)

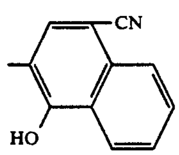

(C3)

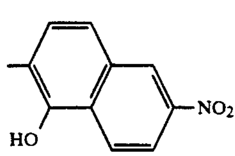

-continued (C4)

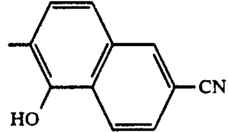

(D1)

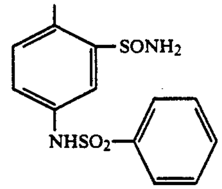

(D2)

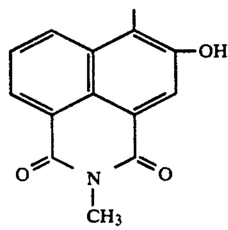

(D3)

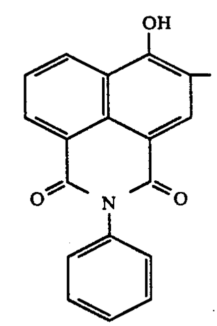

wherein $R^{14}$ indicates a hydrogen atom, a chlorine atom at the 2-position or 3-position of a benzene ring, or a cyano atom at the 3-position of a benzene ring.

The azo compound of the present invention represented by any of the general formulas IA, IB, IC, IIA, IIB and IIC is identified by having a diphenoquinone structure as the central skeleton and taking a plane structure as for the molecular structure as a compound. In the entire central structure, $\pi$-conjugate electrons are distributed. Therefore, the azo compound behaves such that inter-molecular overlapping is accelerated to strengthen the inter-molecular mutual actions upon use. Because of this, the azo compound exhibits an excellent carrier generating function and an excellent electron transporting function.

In consequence, the azo compound represented by any of the general formulas IA, IB, IC, IIA, IIB and IIC to be provided according to the present invention is not only usable as a coloring pigment but also applicable in electronic devices such as organic photoconductors, photoelectric conversion elements, optical information memory elements, etc., and thus, it is of a high industrial utility value.

The organic electrophotographic photosensitive member to be provided according to the present invention excels in photosensitivity and durability due to the use of the azo compound. It can be used not only in various electrophotographic copying machines but also in a laser beam printer, a CRT printer, an LED printer, a liquid crystal printer, laser processing, or the like.

Thus, the invention described herein makes possible the following advantages:

(1) Providing a new azo compound having a diphenoquinone structure;

(2) Providing a new azo compound which has a diphenoquinone structure exhibiting an electron transporting property as the central skeleton, takes a plane structure, and has excellent functions for generating carriers and transporting electrons;

(3) Providing a new azo compound of a high industrial utility value having a diphenoquinone structure exhibiting an electron transporting property as the central skeleton, taking a plane structure, and having excellent functions for generating carriers and transporting electrons, the azo compound being not only usable as a coloring pigment but also applicable in electronic devices such as organic photoconductors, photoelectric conversion elements, optical information memory elements, and the like;

(4) Providing an organic electrophotographic photosensitive member comprising a photosensitive layer having excellent charge generating and electron transporting properties; and (5) Providing an organic electrophotographic photosensitive member comprising a photosensitive layer formed by using a new azo compound having a diphenoquinone structure exhibiting an electron transporting property as the central skeleton, taking a plane structure, and having excellent functions for generating carriers and transporting electrons.

As described above, the electrophotographic photosensitive member according to the present invention comprises a photosensitive layer containing a specific azo compound having a high sensitivity and light stability. Therefore, it is superior in durability and has high sensitivity.

These and other advantages of the present invention will become apparent to those skilled in the art upon reading and understanding the following detailed description with reference to the accompanying figures.

DESCRIPTION OF THE PREFERRED EMBODIMENTS

Figure 1:
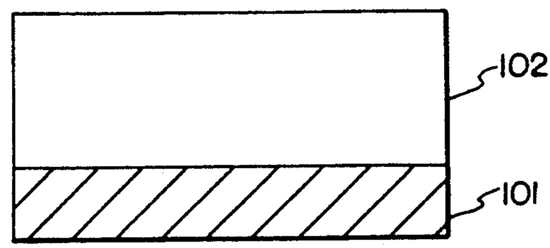
FIGS. 1 through 3 are diagrams showing exemplified structures of an organic electrophotographic photosensitive member according to the present invention.

Azo compound provided by the present invention

In an azo compound provided by the present invention having a diphenoquinone structure represented by any of the following general formulas IA, IB, IC, IIA, IIB and IIC:

(IA)

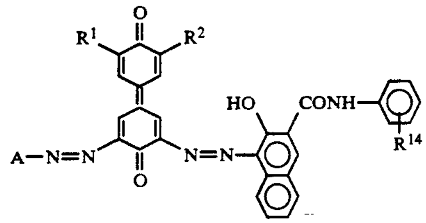

-continued (IB)

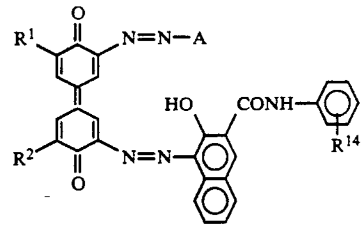

(IC)

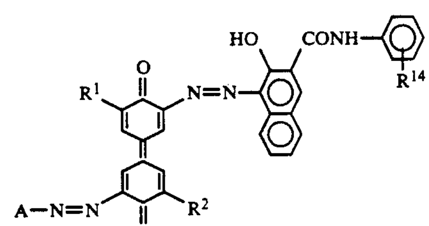

(IIA)

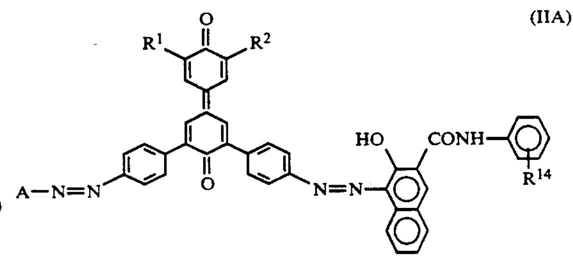

(IIB)

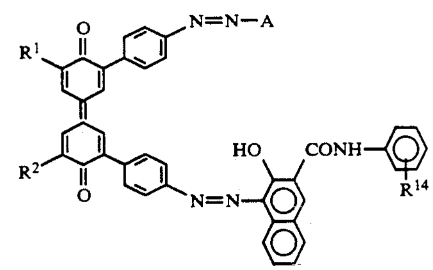

(IIC)

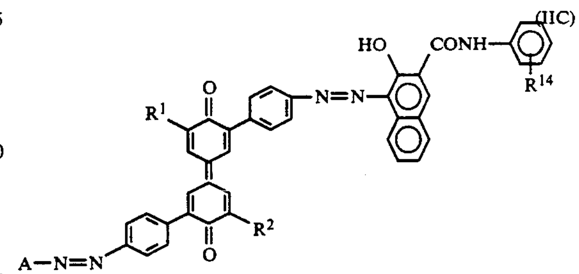

a coupler residue A may comprise a coupler which is used in azo dyes. The following coupler residues a through f are preferred:

(a)

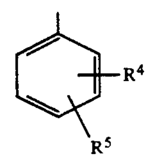

-continued (b)

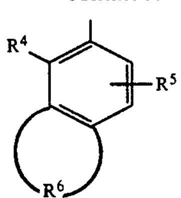

(c)

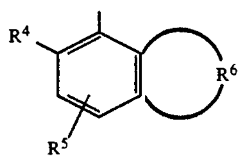

(d)

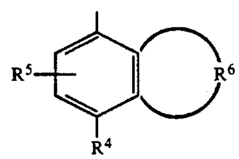

(e)

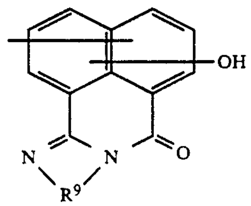

(f)

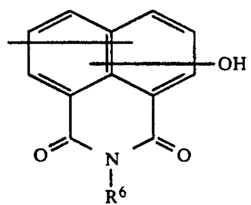

In the above formulas, $R^4$ indicates a hydroxyl group, a group represented by $-NR^{10}R^{11}$ (wherein $R^{10}$ and $R^{11}$ may be the same or different from each other and respectively indicate a hydrogen atom or an alkyl group), or a group represented by $-NHSO_2R^{12}$ (wherein $R^{12}$ indicates a hydrogen atom, an alkyl group, an alkenyl group or an aryl group);

$R^5$ indicates a halogen atom, a carboxyl group or a sulfamoyl group, wherein a sulfamoyl group may have a substituent group of a carbonyl group or a carboxyl group; and $R^6$ indicates an atomic group necessary for the formation of an aromatic ring, an aliphatic ring or a heterocyclic ring in condensation with a benzene ring having $R^4$ and $R^5$, wherein these rings may have a substituent group of a carbonyl group or a carboxyl group.

Examples of the atomic group necessary for the formation of an aliphatic ring in condensation with a benzene ring having $R^4$ and $R^5$ include alkylene groups having 1 to 4 carbon atoms such as a methylene group, an ethylene group, a propylene group and a butylene group.

Further, examples of the atomic group forming a heterocyclic ring in condensation with a benzene ring having $R^4$ and $R^5$ include a benzofuranyl group, a benzothiophenyl group, a benzooxazolyl group, a benzothiazolyl group, a 1H-indazolyl group, a chromenyl group, a chromanyl group, an isochromanyl group, a dibenzofuranyl group, a xanthenyl group, an acridinyl group, a phenanthridinyl group, a phenazinyl group, a phenoxadinyl group, a thianthrenyl group and the like.

Examples of the aromatic heterocyclic ring group formed in condensation with a benzene ring having $R^4$ and $R^5$ include a thienyl group, a furyl group, a pyrrolyl group, an oxazolyl group, an isooxazolyl group, a thiazolyl group, an isothiazolyl group, an imidazolyl group, a pyrazolyl group, a triazolyl group, a tetrazolyl group, a pyridyl group and a thiazolyl group. Likewise, a heterocyclic ring group formed in condensation with an aromatic ring such as a benzofuranyl group, a benzoimidazolyl group, a benzooxazolyl group, a benzothiazolyl group, a quinolyl group and the like may be used.

$R^8$ is a hydrogen atom, an alkyl group or an aryl group, wherein the alkyl group or the aryl group can have a substituent group of a carbonyl group or a carboxyl group.

$R^9$ is a phenylene group or a naphthylene group which may have a substituent group of a carbonyl group or a carboxyl group.

The alkyl group can include lower alkyl groups having 1 to 6 carbon atoms such as a methyl group, an ethyl group, a propyl group, an isopropyl group, a butyl group, an isobutyl group, a tert-butyl group, a pentyl group, a hexyl group and the like.

The aryl group can include a phenyl group, a tolyl group, a xylyl group, a biphenyl group, a naphthyl group, an anthryl group, a phenanthryl group and the like.

The halogen atom can include a chlorine atom, a bromine atom, an iodine atom and a fluorine atom.

Examples of the coupler residue A having the properties of an acceptor and represented by any of the general formulas a through f include groups with strong acceptor properties represented by the following formulas C1 through C4 and groups with extremely strong acceptor properties represented by the following formulas D1 through D3:

(C1)

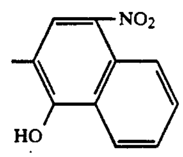

(C2)

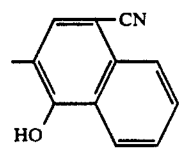

(C3)

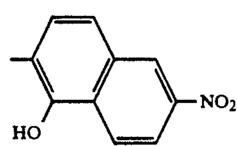

(C4)

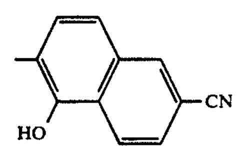

-continued (D1)

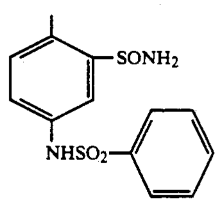

(D2)

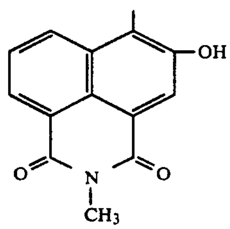

(D3)

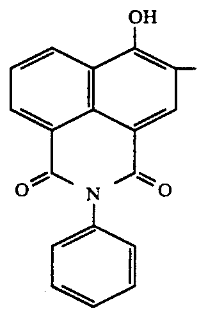

The electrophotographic photosensitive member of the present invention can include one of or a combination of two or more of the above-mentioned azo compounds. In addition, it can include a combination of the azo compounds and the other known charge generating materials (described below).

The azo compound of the present invention represented by the general formula IA can be produced by various methods in which diazonium salt represented by the following formula II is produced as an intermediate:

(II)

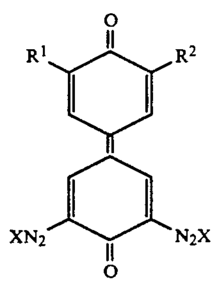

(wherein X is an anion of hydroacid haloganate such as hydrochloric acid, hydroacid fluoroboride, hydrobromic acid, sulfuric acid, nitric acid, perchloric acid and other acids).

An example of the producing methods is as follows:

To 0.002 mole of the tetrazoniumfluoroborate represented by the general formula II, a solution obtained by dissolving 0.002 mole of a coupler having the following general formula III in 100 ml of N,N-dimethylformamide and adding, to the resultant mixture, a solution obtained by dissolving 0.002 mole of sodium acetate in 5 ml of water was further dropwise added in the same manner as above. The reaction mixture was then stirred for another 3 hours to form a precipitate.

(III)

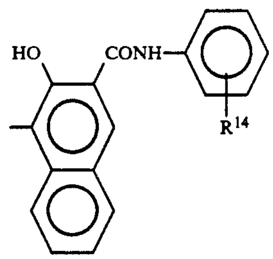

The resultant precipitate was filtrated and washed with 200 ml of N,N-dimethylformamide five times. The resultant was then washed with 200 ml of water three times, followed by subjecting to drying under reduced pressure, thereby obtaining the azo compound according to the present invention.

The compounds of the present invention represented by the general formulas IB and IC can be produced in the same manner.

The azo compound of the present invention represented by the general formula IIA can be produced by the same method as is used for producing the compound represented by the general formula IA except for a diazonium salt represented by the following general formula IV produced as an intermediate:

(IV)

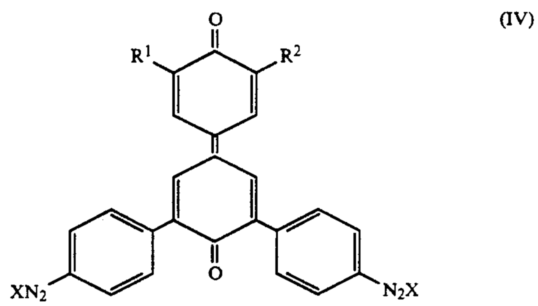

(wherein X is an anion of hydroacid haloganate such as hydrochloric acid, hydroacid fluoroboride, hydrobromic acid, sulfuric acid, nitric acid, perchloric acid and other acids).

The azo compounds of the present invention represented by the general formulas IIB and IIC can be produced in the same manner.

Organic electrophotographic photosensitive members to be provided according to the present invention The electrophotographic photosensitive member according to the present invention comprises a conductive substrate and a photosensitive layer disposed on the conductive substrate and containing the foregoing azo compound. The term "photosensitive layer" used herein is a general term to include all the layers to be disposed on the conductive substrate.

The photosensitive layer can be of a singlelayered structure or a multilayered structure comprising a plurality of functionally divided layers being stacked.

In the case where the photosensitive layer is of a single-layered structure, the electrophotographic photosensitive member takes a configuration such as shown in FIG. 1, which comprises a conductive substrate 101 and a photosensitive layer 102 disposed on the conductive substrate. The photosensitive layer 102 contains the azo compound of the present invention as a charge generating material together with a charge transporting material and a binder resin.

Figure 2:
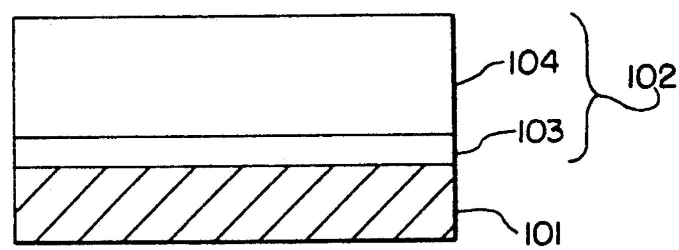

In cases where the photosensitive layer is of a functionally divided multilayered structure, the electrophotographic photosensitive member takes a configuration such as shown in FIG. 2, which comprises a conductive substrate 101; a charge generating layer 103 disposed on the conductive substrate 101; and a charge transporting layer 104 disposed on the charge generating layer 103. In this manner, a photosensitive layer 102 of the multilayered type comprises the charge generating layer 103 and the charge transporting layer 104 disposed thereon. The charge generating layer 103 contains the azo compound of the present invention as a charge generating material and a binder resin, and is formed by evaporating or by applying the charge generating material dispersed in a proper binder resin. The charge transporting layer 104 contains a charge transporting material and a binder resin. The charge generating layer 103 and the charge transporting layer 104 shown in FIG. 2 can be formed in the reverse order in the photosensitive member as is shown in FIG. 3.

In the case of the photosensitive layer with the single-layered structure shown in FIG. 1, the photosensitive layer 102 contains 0.1 to 50 parts by weight, preferably 0.5 to 30 parts by weight, of the azo compound of the present invention as the charge generating material per 100 parts by weight of the resin binder. Further, the photosensitive layer 102 contains 40 to 200 parts by weight, preferably 50 to 100 parts by weight, of the charge transporting material per 100 parts by weight of the resin binder.

Figure 3:
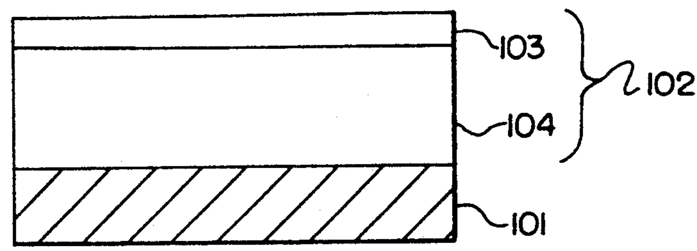

When the photosensitive layer has the multilayered structure shown in FIGS. 2 and 3, in which the charge generating layer 103 is of a resin-dispersed type, the charge generating layer 103 contains 5 to 500 parts by weight, preferably 10 to 300 parts by weight, of the azo compound of the present invention as the charge generating material per 100 parts by weight of the resin binder. The charge transporting layer 104 further contains 10 to 500 parts by weight, preferably 25 to 200 parts by weight, of the charge transporting material per 100 parts by weight of the resin binder.

The thickness of the photosensitive layer in the photosensitive member of FIGS. 1 through 3 is about 5 to 100 μm, preferably about 10 to 50 μm in the single-layered type. When the photosensitive layer is a multilayered type, the thickness of the charge generating layer is about 0.01 to 5 μm, preferably 0.1 to 3 μm, and that of the charge transporting layer is about 2 to 100 μm, preferably about 5 to 50 μm.

As for each of the above-mentioned photosensitive members, a proper modification can be made. A conventional barrier layer can be disposed, for example, between the conductive substrate and the photosensitive layer in the single-layered type or between the conductive layer and the charge generating layer, the conductive substrate and the charge transporting layer, and the charge generating layer and the charge transporting layer in the multilayer type. The barrier layer serves to exhibit an adhesion and/or an appropriate barrier property with respect to charge injection. The barrier layer is formed using an appropriate material such as casein, polyvinyl alcohol, polyamide resin, etc. The thickness thereof is properly determined in the range of some micronmeters to some tens micronmeters as long as the characteristics of the photosensitive member are not hindered. Other than this, it is possible to dispose a conventional surface protective layer in order to improve the durability of the photosensitive member.

Each constituent material of the electrophotographic photosensitive member of the present invention will now be described.

Conductive substrate

As the conductive substrate, various materials having a conductivity can be used. Examples include a simple substance of a metal such as aluminum, copper, tin, platinum, gold, silver, vanadium, molybdenum, chromium, cadmium, titanium, nickel, palladium, indium, stainless steel, or brass; plastic membess evaporated or laminated with these metals thereon; and glass members coated with aluminum iodide, tin oxide, or indium oxide thereon.

Any of these conductive substrates may be of a sheet-like shape or a drum-like shape. It is desired for the substrate to be such that is conductive by itself or has a conductive surface and that has a mechanical strength to be sufficiently durable upon use.

Charge transporting material

As the charge transporting material, any conventional material can be used. Examples include oxadiazole compounds such as 2,5-di(4-methylaminophenyl)-1,3,4-oxadiazole, etc.; styryl compounds such as 9-(4-diethylaminostyryl)anthracene, etc.; carbazole compounds such as polyvinylcarbazole, etc.; pyrazoline compounds such as 1-phenyl-3-(p-dimethylaminophenyl) pyrazoline, etc.; nitrogen-containing cyclic compounds and condensed polycyclic compounds such as hydrazone compounds, triphenylamine compounds, indole compounds, oxazole compounds, isooxazole compounds, thiazole compounds, thadiazole compounds, imidazole compounds, pyrazole compounds, triazole compounds, etc.

These charge transporting materials may be used either singly or in combinations of two or more of them. In the case of using a charge generating material having a film-forming property such as polyvinylcarbazole or the like, it is not always necessary to use a binder resin.

Binder resin

As the binder resin to be used in each of the photosensitive layers, the charge generating layer and the charge transporting layer, various resins can be used. Examples include thermoplastic resins such as styrenic polymers, styrene-butadiene copolymers styrene-acrylonitrile copolymers, styrene-maleic acid copolymers, styrene-acrylic copolymers, polyethylene, ethylene-vinyl acetate copolymer, chlorinated polyethylene, polyvinyl chloride, polypropylene, vinyl chloride-vinyl acetate copolymer, polyester, alkyd resin, polyamide, polyurethane, polycarbonate, polyarylate, polysulfone, diallyl phthalate resin, ketone resin, polyvinyl butyral resin, polyether resin; crosslinkable thermosetting resins such as silicon resin, epoxy resin, phenol resin, urea resin, melamine resin and the like; and photo-setting resins such as epoxy acrylate, urethane acrylate, etc.

These binder resins may be used either singly or in combinations of two or more of them.

Sensitizer and other additives

As the charge generating material, the azo compound according to the present invention is used singly or in combination of two or more of them. But it is possible to additionally use a conventional charge generating material.

Examples of such a charge generating material include amorphous silicon, pyrylium salt, anthanthrone pigments, phthalocyanine pigments, indigo pigments, triphenylmethane pigments, styrenic pigments, toluidine pigments, pyrazoline pigments, perylene pigments, quinacridone pigments, etc. These charge generating materials are used singly or in combinations of two or more of them so as to have an absorption wavelength region in a desired range.

It is possible to use a conventional sensitizer such as terphenyl, halonaphthoquinones, acenaphthylenes, etc. together with the above-mentioned charge generating material in order to improve the sensitivity of the charge generating layer. Moreover, a surfaceactive agent, a leveling agent or the like can be used to improve dispersion and coating of the charge transporting and generating materials.

Each photosensitive layer of the singlelayered type and the multilayered type can contain, apart from the above-mentioned sensitizer, a deterioration inhibitor such as a fluorene compound, an antioxidant and a UV absorber and an additive such as a plasticizer.

Organic solvent

An appropriate solvent is used in the case of forming each of the charge generating layers and the charge transporting layer by means of coating processes will be described below. As such solvents, various organic solvents can be used. Examples include alcohols such as methanol, ethanol, isopropanol, butanol, etc.; aliphatic hydrocarbons such as n-hexane, octane, cyclohexane, etc.; aromatic hydrocarbons such as benzene, toluene, xylene, etc.; halogenated hydrocarbons such as dichloromethane, dichloroethane, carbon tetrachloride, chlorobenzene, etc.; ethers such as dimethyl ether, diethyl ether, tetrahydrofuran, ethylene glycol dimethyl ether, diethylene glycol dimethyl ether, etc.; ketones such as acetone, methyl ethyl ketone, cyclohexanone, etc.; esters such as ethyl acetate, methyl acetate, etc.; dimethylformamide, dimenthylsulfoxide, etc.

These solvents may be used either singly or in combinations of two or more of them.

Film formation

Each of the charge generating layer and the charge transporting layer may be formed by means of a coating process. For instance, the charge generating layer may be formed by properly adjusting the foregoing charge generating material and the foregoing binder resin by means of a roll mill, a ball mill, an attritor, a paint shaker, or an ultrasonic dispersing device, applying the coating composition by a conventional coating method, followed by drying. In an alternative, as above described, the charge generating layer may be formed by evaporating the foregoing charge generating material.

The function of the azo compound of the present invention as the charge generating material contained in a photosensitive layer of an electrophotographic photosensitive member will now be described.

The azo compound according to the present invention represented by any of the following general formulas IA, IB and IC is formed as follows:

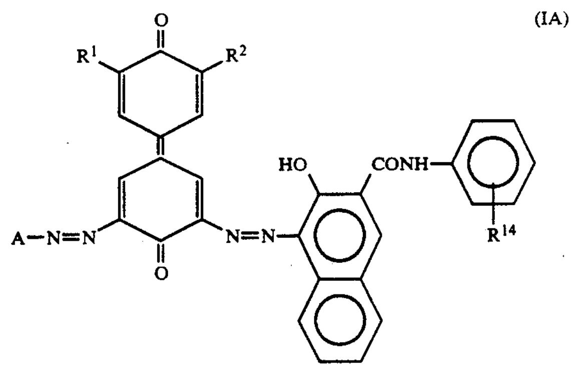

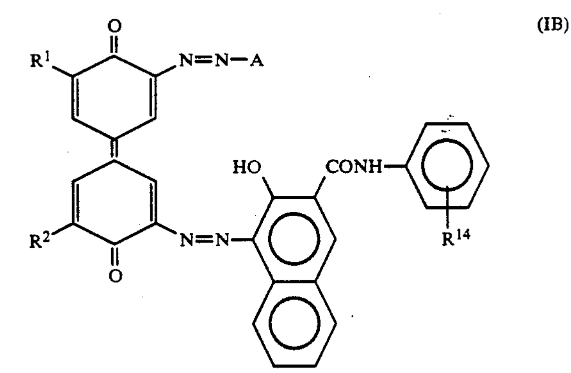

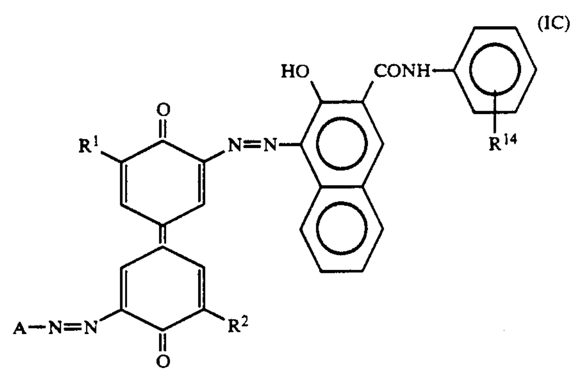

A coupler residue portion having an intermediate doner property represented by the following general formula III is connected to one core with an acceptor property represented by the following formula V and a coupler residue A having a strong acceptor property is connected to the other core having the acceptor property.

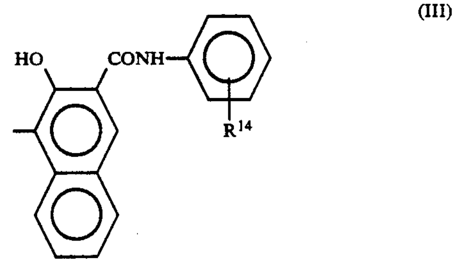

-continued

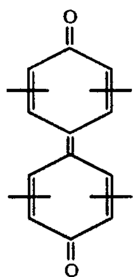

(V)

The azo compound according to the present invention represented by any of the following general formulas IIA, IIB and IIC is formed as follows:

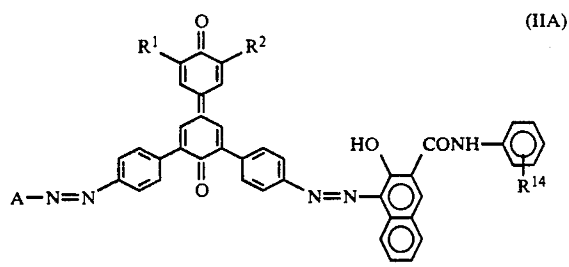

(IIA)

(IIB)

(IIC)

A coupler residue portion having an intermediate doner property represented by the general formula III is connected to one core with an acceptor property represented by the following general formulas IIIA, IIIB and IIIC and a coupler residue A having a strong acceptor property is connected to the other core having the acceptor property.

(IIIA)

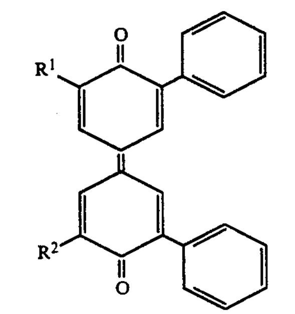

(IIIB)

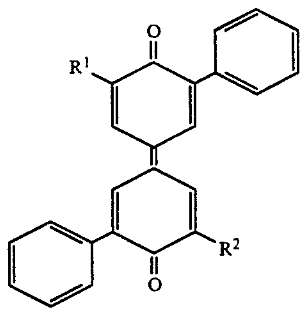

(IIIC)

As a result, from the distribution of the electron density of molecules in the azo compound, the charge generating material is biased, thereby remarkably improving the sensitivity of the photosensitive member. In other words, the bias of the electron density distribution makes polarization of the molecules larger in their excited states, thereby improving the charge generating efficiency due to the strong internal polarization in the azo compound and improving the carrier injection efficiency into the charge transporting material due to an increased interaction with the charge transporting material.

As described above, the electrophotographic photosensitive member according to the present invention includes a photosensitive layer comprising a specific azo compound having a high sensitivity and a light stability. Therefore, the photosensitive member has a high sensitivity and an excellent durability.

EXAMPLES

The present invention will now be described in detail by way of the examples.

EXAMPLES 1 THROUGH 4

Single layered type and multilayered type photosensitive members were produced in the following manner by using, as a charge generating material, an azo compound represented by the following general formula Ia (Table 1 shows a coupler residue A and an introducing position and a type of $R^{14}$, respectively).

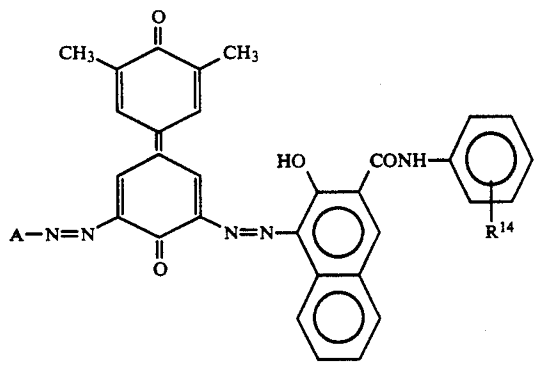
(Ia)

Peparation of a single-layered type electrophotographic photosensitive member

A mixture of 8 parts by weight of one of the azo compounds as the charge generating material, 100 parts by weight of 3,3'-dimethyl-N,N,N',N'-tetrakis-4-methylphenyl-(1,1'-biphenyl)-4,4'-diamine as the charge transporting material, 100 parts by weight of polyester resin as the binder resin, and a predetermined amount of tetrahydrofuran was well mixed and dispersed by using a ball mill, thereby preparing a coating composition for a single-layered type electrophotographic photosensitive member.

The coating composition thus obtained was applied onto the surface of an aluminum cylinder with a diameter of 80 mm and a length of 350 mm by a dip coating method, followed by heat drying at 100° C. for 30 minutes in the dark. In this manner, a drum-like, positive charge type electrophotographic photosensitive member having a 24 μm thick single photosensitive layer was obtained.

Preparation of a multilayered type electrophotographic photosensitive member

A mixture of 100 parts by weight of polyvinyl butyrazol as the binder resin, 100 parts by weight of one of the azo compounds as the charge generating material and a predetermined amount of tetrahydrofuran was introduced into a ball mill to be mixed while stirring for 24 hours, thereby obtaining a coating composition for a charge generating layer.

The coating composition was applied onto the surface of an aluminum cylinder with a diameter of 80 mm and a length of 350 mm by the dip coating method, followed by heat drying at 110° C. for 30 minutes in the dark, thereby obtaining a charge generating layer with a thickness of 0.5 μm.

Then, a mixture of 100 parts by weight of polycarbonate as the binder resin, 100 parts by weight of 3,3'-dimethyl-N,N,N',N'-tetrakis-4-methylphenyl-(1,1'-biphenyl)-4,4'-diamine as the charge transporting material, and a predetermined amount of toluene was introduced into a homomixer to be mixed while stirring, thereby obtaining a coating composition for a charge transporting layer.

The coating composition thus obtained was applied onto the surface of the previously formed charge generating layer by the dip coating method, followed by heat drying at 90° C. for 30 minutes, thereby obtaining a charge transporting layer with a thickness of about 20 μm. Thus, a drum-like, negative charge type electrophotographic photosensitive membrane having a multilayered type photosensitive layer was produced.

EXAMPLES 8 THROUGH 14

Single layered type and multilayered type photosensitive members were produced in the same manner as in Example 1 except for using, as the charge generating material, the azo compound represented by the following general formula IIa (Table 1 shows a coupler residue A and an introducing position and a type of $R^{14}$, respectively).

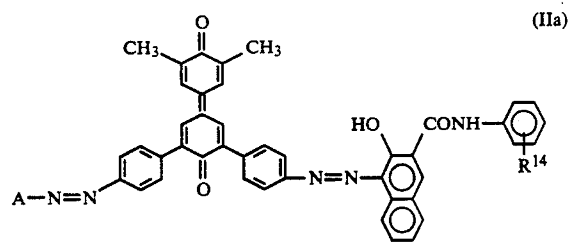
(IIa)

COMPARATIVE EXAMPLES 1 THROUGH 5

Single layered type and multilayered type photosensitive members were produced in the same manner as in Example 1 except for using, as the charge generating material, the azo compound represented by the following general formula VI:

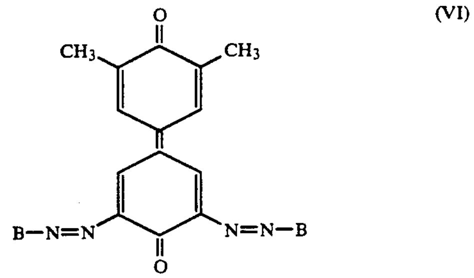
(VI)

(wherein B indicates a coupler residue).

Examples of the coupler residue B include groups represented by the following general formulas E1 through E5. Table 2 shows the groups used in Comparative Examples 1 through 5.

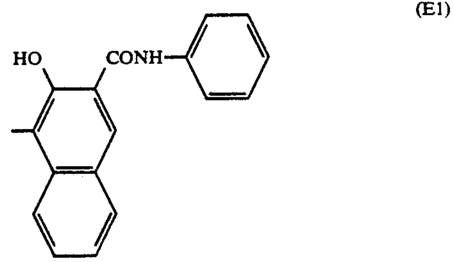
(E1)

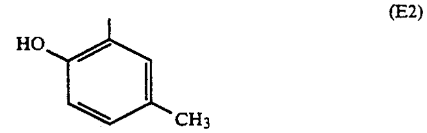
(E2)

-continued (E3)

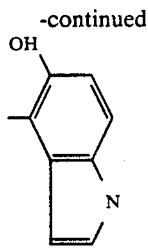

(E4)

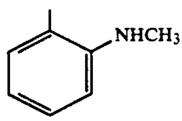

(E5)

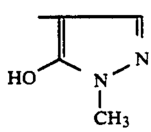

COMPARATIVE EXAMPLES 6 THROUGH 8

Single layered type and multilayered type photosensitive members were produced in the same manner as in Example 1 except for using, as the charge generating material, the azo compound represented by the following general formula Ib:

(Ib)

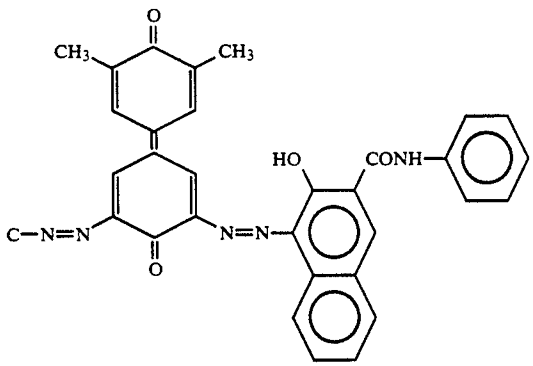

(wherein C indicates a coupler residue).

Examples of the coupler residue C include groups represented by the following general formulas E3, E5, and E6. Table 2 shows the groups used in Comparative Examples 6 through 8.

(E3)

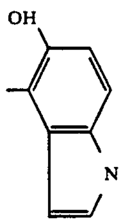

(E5)

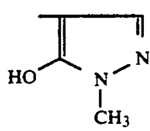

-continued (E6)

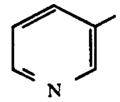

COMPARATIVE EXAMPLES 9 THROUGH 13

Single layered type and multilayered type photosensitive members were produced in the same manner as in Example 1 except for using, as the charge generating material, the azo compound represented by the following general formula VII:

(VII)

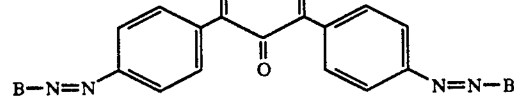

(wherein B indicates a coupler residue).

Examples of the coupler residue B include groups represented by the foregoing general formulas E1 through E5. Table 2 shows the groups used in Comparative Examples 9 through 13.

COMPARATIVE EXAMPLES 14 THROUGH 16

Single layered type and multilayered type photosensitive members were produced in the same manner as in Example 1 except for using, as the charge generating material, the azo compound represented by the following general formula IIb:

(IIb)

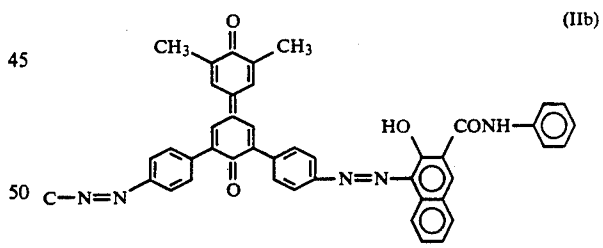

(wherein C indicates a coupler residue).

Examples of the coupler residue C include groups represented by the foregoing general formulas E3, E5 and E6. Table 2 shows the groups used in Comparative Examples 14 through 16.

EVALUATION

As for each of the resultant electrophotographic photosensitive members obtained in each of the production examples and the comparative production examples, the initial surface potential (Vs.p.), half decay energy (E1/2), and residual potential (Vr.p.) thereof were respectively measured and the usability thereof was evaluated.

Measurement of initial surface potential

Each of the electrophotographic photosensitive members was set to a commercially available electrostatic reproduction testing apparatus (trademark name: Gentec CYNCIA 30M, produced by Gentec Co., Ltd.), wherein the surface thereof was subjected to charging with a positive or negative polarity to measure the surface potential Vs.p. (V).

Measurement of half decay energy and residual potential

Each of the electrophotographic photosensitive members under charged state in the foregoing electrostatic reproduction testing apparatus was subjected to exposure at an intensity of 10 lux using a halogen lamp of the apparatus as the exposure light source to measure a period of time until the surface potential Vs.p. (V) was halved. Based on the measured result, the half decay energy E1/2 (lux.sec.) was calculated.

Further, the surface potential after the lapse of 0.15 seconds since the exposure started was made to be the residual potential V1r.p. (V).

Measurement of light stability

Each of the electrophotographic photosensitive members was set to a commercially available electrostatic copying machine DC-111 (produced by Mita Industrial Co., Ltd.). After repeating the reproduction process 1000 times, a residual potential V2r.p. (V) was measured in the same manner as above. The difference between the residual potentials V1r.p. and V2r.p. was calculated as ΔVr.p. (V).

The results of the above measurements are shown in Tables 1 and 2.

From the results shown in Tables 1 and 2, the following facts were found:

The residual potential Vr.p. of any of the photosensitive members of the single-layered type and the multi-layered type obtained in the above examples is markedly small in comparison with that of the comparative photosensitive member and excels in stability against light. Moreover, it is low in half decay energy E1/2, stably exhibits a high sensitivity and excels in durability. As a result, it was found to be suitable as the charge generating material.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

TABLE 1

| Group | | | Structure of layer | Vs.p. (V) | V1r.p. (V) | $E_{\frac{1}{2}}$ (lux · s) | p. ΔVr.p. |
|---|---|---|---|---|---|---|---|
| Ex. 1 | A | C1 | single | +824 | +21 | 0.59 | +3 |
| | $R^{14}$ | 2-Cl | multi | −820 | −25 | 0.61 | +2 |
| Ex. 2 | A | C2 | single | +818 | +20 | 0.58 | +4 |
| | $R^{14}$ | 3-Cl | multi | −823 | −24 | 0.63 | ±0 |
| Ex. 3 | A | C3 | single | +830 | +21 | 0.61 | ±0 |
| | $R^{14}$ | 3-CN | multi | −826 | −23 | 0.63 | +5 |
| Ex. 4 | A | C4 | single | +835 | +24 | 0.62 | ±0 |
| | $R^{14}$ | H | multi | −831 | −22 | 0.61 | ±0 |
| Ex. 5 | A | D1 | single | +830 | +15 | 0.57 | +4 |
| | $R^{14}$ | 2-Cl | multi | −832 | −17 | 0.53 | +3 |
| Ex. 6 | A | D2 | single | +829 | +21 | 0.59 | ±0 |
| | $R^{14}$ | H | multi | −833 | −22 | 0.58 | ±0 |

TABLE 1-continued

| Group | | | Structure of layer | Vs.p. (V) | V1r.p. (V) | $E_{\frac{1}{2}}$ (lux · s) | p. ΔVr.p. |
|---|---|---|---|---|---|---|---|
| Ex. 7 | A | D3 | single | +808 | +16 | 0.55 | ±0 |
| | $R^{14}$ | H | multi | −805 | −18 | 0.54 | ±0 |
| Ex. 8 | A | C1 | single | +831 | +24 | 0.61 | +5 |
| | $R^{14}$ | 2-Cl | multi | −803 | −21 | 0.58 | +3 |
| Ex. 9 | A | C2 | single | +827 | +21 | 0.57 | +2 |
| | $R^{14}$ | 3-Cl | multi | −844 | −23 | 0.62 | +3 |
| Ex. 10 | A | C3 | single | +845 | +25 | 0.63 | +4 |
| | $R^{14}$ | 3-CN | multi | −838 | −20 | 0.61 | +2 |
| Ex. 11 | A | C4 | single | +831 | +26 | 0.62 | +5 |
| | $R^{14}$ | H | multi | −826 | −23 | 0.60 | +2 |
| Ex. 12 | A | D1 | single | +836 | +21 | 0.58 | +2 |
| | $R^{14}$ | 2-Cl | multi | −828 | −18 | 0.55 | +2 |
| Ex. 13 | A | D2 | single | +815 | +19 | 0.61 | +3 |
| | R14 | H | multi | −817 | −22 | 0.57 | ±0 |
| Ex. 14 | A | D3 | single | +820 | +15 | 0.56 | ±0 |
| | $R^{14}$ | H | multi | −822 | −17 | 0.53 | +2 |

TABLE 2

| Coupler Residue B or C | | Structure of layer | Vs.p. (V) | V1r.p. (V) | $E_{\frac{1}{2}}$ (lux · s) | ΔVr.p. |
|---|---|---|---|---|---|---|
| Comp. Ex. 1 | E1 | single | +840 | +32 | 0.69 | +3 |
| | | multi | −823 | −27 | 0.61 | +5 |
| Comp. Ex. 2 | E2 | single | +815 | +60 | 0.78 | +5 |
| | | multi | −835 | −55 | 0.75 | +8 |
| Comp. Ex. 3 | E3 | single | +840 | +78 | 0.93 | +10 |
| | | multi | −837 | −60 | 0.80 | +5 |
| Comp. Ex. 4 | E4 | single | +820 | +80 | 0.82 | ±0 |
| | | multi | −830 | −50 | 0.70 | ±0 |
| Comp. Ex. 5 | E5 | single | +810 | +92 | 1.01 | ±0 |
| | | multi | −805 | −78 | 0.90 | +3 |
| Comp. Ex. 6 | E6 | single | +832 | +81 | 0.90 | +3 |
| | | multi | −815 | −72 | 0.78 | +5 |
| Comp. Ex. 7 | E5 | single | +803 | +84 | 0.92 | +8 |
| | | multi | −818 | −73 | 0.84 | ±0 |
| Comp. Ex. 8 | E3 | single | +824 | +80 | 0.85 | +3 |
| | | multi | −832 | −78 | 0.82 | +5 |
| Comp. Ex. 9 | E1 | single | +840 | +32 | 0.69 | +5 |
| | | multi | −823 | −27 | 0.61 | +3 |
| Comp. Ex. 10 | E2 | single | +850 | +101 | 0.90 | +8 |
| | | multi | −865 | −72 | 0.83 | +5 |
| Comp. Ex. 11 | E3 | single | +840 | +92 | 0.96 | +10 |
| | | multi | −830 | −83 | 0.92 | +8 |
| Comp. Ex. 12 | E4 | single | +832 | +55 | 0.70 | +8 |
| | | multi | −840 | −57 | 0.63 | +6 |
| Comp. Ex. 13 | E5 | single | +840 | +60 | 0.84 | ±0 |
| | | multi | −827 | −55 | 0.80 | +3 |
| Comp. Ex. 14 | E6 | single | +824 | +88 | 0.98 | +8 |
| | | multi | −835 | −79 | 0.90 | +7 |
| Comp. Ex. 15 | E5 | single | +837 | +82 | 0.87 | +10 |
| | | multi | −825 | −75 | 0.84 | +8 |
| Comp. Ex. 16 | E3 | single | +833 | +83 | 0.93 | +5 |
| | | multi | −842 | −75 | 0.85 | ±0 |

What is claimed is:

1. An electrophotographic photosensitive member comprising a conductive substrate and a photosensitive layer deposited on the conductive substrate, wherein the photosensitive layer comprises a charge generating material and a charge transporting material;

the charge generating material comprising an azo compound having a diphenoquinone structure selected from the group consisting of structures represented by the following general formulas IA, IB, IC, IIA, IIB and IIC:

(IA)

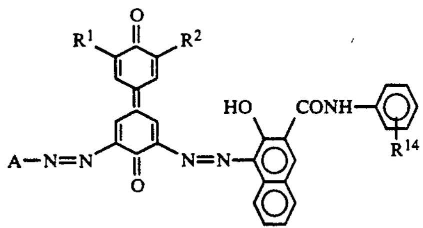

(IB)

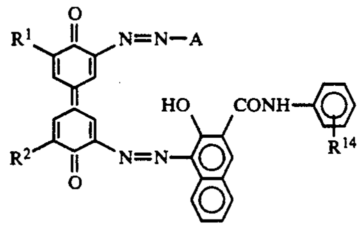

(IC)

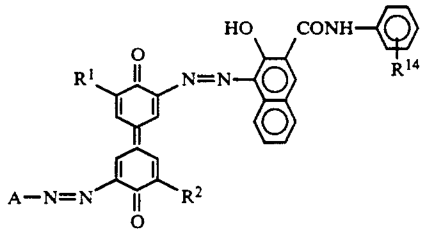

(IIA)

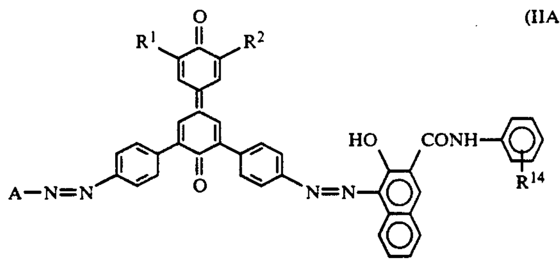

(IIB)

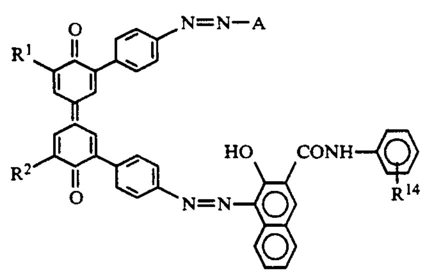

(IIC)

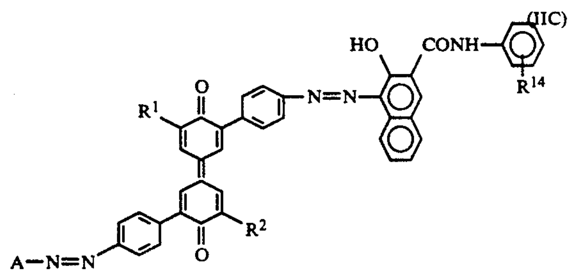

wherein $R^1$ and $R^2$ are the same or different from each other and are a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ is a hydrogen atom, a halogen group, an alkyl group, an alkoxy group, an aryl group, an amino group, a cyano group, a nitro group or a sulfoxide group; and A is a coupler residue having an acceptor property.

2. An electrophotographic photosensitive member according to claim 1, wherein the photosensitive layer is of a single-layered structure comprising a charge generating material, a charge transporting material and a binder resin.

3. An electrophotographic photosensitive member according to claim 1, wherein the photosensitive layer is of a multilayered structure comprising a charge generating layer including the charge generating material and a binder resin, and a charge transporting layer including the charge transporting material and a binder resin.

4. An electrophotographic photosensitive member according to claim 2, wherein 0.1 to 50 parts by weight of the charge generating material and 40 to 200 parts by weight of the charge transporting material are contained per 100 parts by weight of the a binder resin.

5. An electrophotographic photosensitive member according to claim 3, wherein 5 to 500 parts by weight of the charge generating material and 10 to 500 parts by weight of the charge transporting material are contained per 100 parts by weight of the a binder resin.

6. An electrophotographic photosensitive member according to claim 2, wherein the photosensitive layer has a thickness of 5 to 100 $\mu$m.

7. An electrophotographic photosensitive member according to claim 3, wherein thickness of the charge generating layer and the charge transporting layer are respectively 0.01 to 5 $\mu$m and 2 to 100 $\mu$m.

8. An electrophotographic photosensitive member according to claim 1, wherein the coupler residue A having an acceptor property is one selected from the group consisting of groups represented by the following general formulas a through f:

(a)

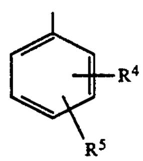

(b)

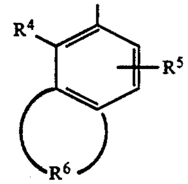

(c)

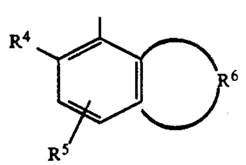

-continued

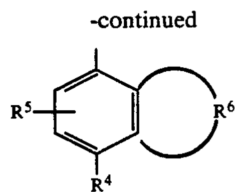

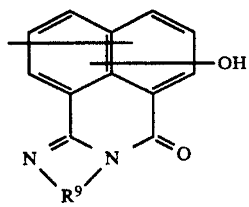

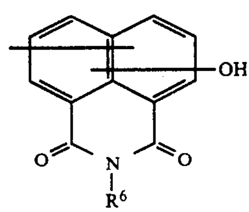

wherein $R^4$ is a hydroxyl group, a group represented by $—NR^{10}R^{11}$ (wherein $R^{10}$ and $R^{11}$ are the same or different from each other and respectively are a hydrogen atom or an alkyl group), or a group represented by $—NHSO_2R^{12}$ (wherein $R^{12}$ is a hydrogen atom, an alkyl group, an alkenyl group or an aryl group);

$R^5$ is a halogen atom, a carboxyl group or a sulfamoyl group;

$R^6$ indicates an atomic group necessary for the formation of an aromatic ring, an aliphatic ring or a heterocyclic ring in condensation with a benzene ring having $R^4$ and $R^5$;

$R^8$ is a hydrogen atom, an alkyl group or an aryl group; and $R^9$ is a phenylene group or a naphthylene group.

9. An electrophotographic photosensitive member according to claim 1, wherein the coupler residue A is one selected from the group consisting of groups represented by the following general formulas C1, C2, C3, C4, D1, D2 and D3:

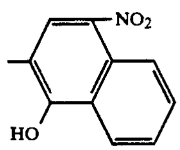

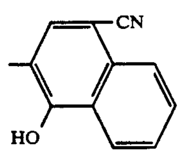

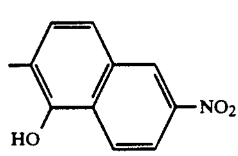

-continued

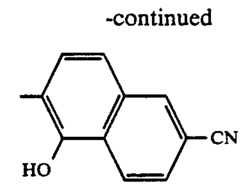

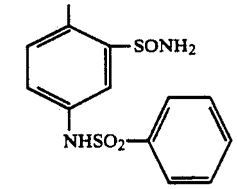

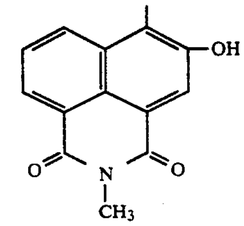

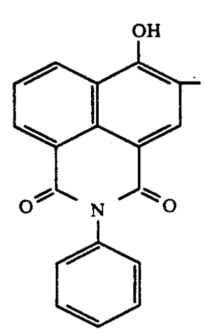

10. An electrophotographic photosensitive member according to claim 1, wherein the conductive substrate is aluminum, copper, tim, platinum, gold, silver, vanadium, molybdenum, chromium, cadmium, titanium, nickel, palladium, indium, stainless steel or brass.

11. An electrophotographic photosensitive member according to claim 3, wherein the binder resin is a thermoplastic resin, a crosslinkable thermosetting resin or a photo-setting resin.

12. An electrophotographic photosensitive member comprising a conductive substrate and a photosensitive layer deposited on the conductive substrate, wherein the photosensitive layer comprises a charge generating material and a charge transporting material;

the charge generating material comprising an azo compound having a diphenoquinone structure selected from the group consisting of structures represented by the following general formulae IA, IB and IC:

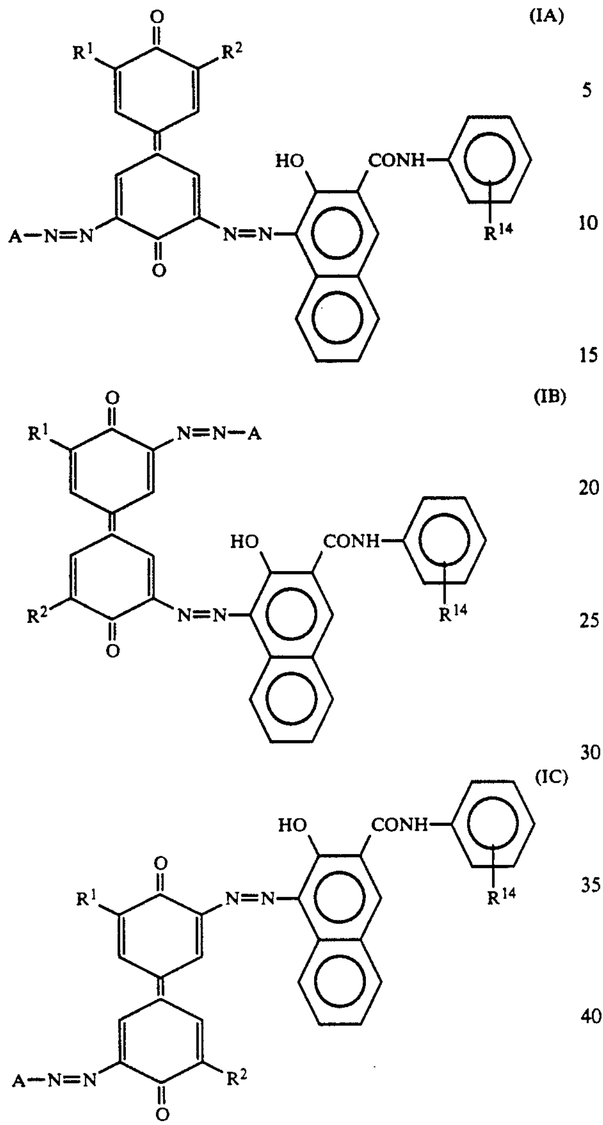

wherein $R^1$ and $R^2$ are the same or different from each other and are a hydrogen atom, an alkyl group, an alkenyl group, a hydroxyl group, an alkoxy group, a carboxy group, an alkoxy carbonyl group, an acyl group, an aryl group, a halogen group or a cyano group, respectively; $R^{14}$ is a hydrogen atom, a halogen group, an alkyl group, an alkoxy group, an aryl group, an amino group, a cyano group, a nitro group or a sulfoxide group; and A is a coupler residue having an acceptor property.

13. An electrophotographic photosensitive member according to claim 12, wherein the photosensitive layer is of a single-layered structure comprising a charge generating material, a charge transporting material and a binder resin.

14. An electrophotographic photosensitive member according to claim 12, wherein the photosensitive layer is of a multilayered structure comprising a charge generating layer including the charge generating material and a binder resin, a charge transporting layer including the charge transporting material and a binder resin.

15. An electrophotographic photosensitive member according to claim 12, wherein the coupler residue A having an acceptor property is one selected from the group consisting of groups represented by the following general formulas a through f:

(a)

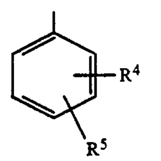

(b)

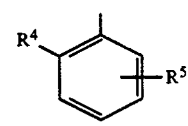

R6

(c)

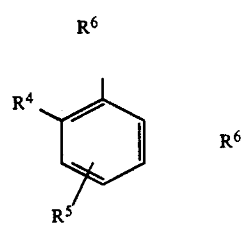

(d)

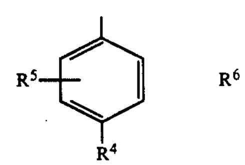

(e)

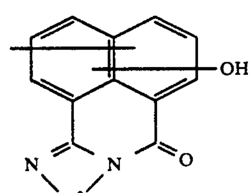

(f)

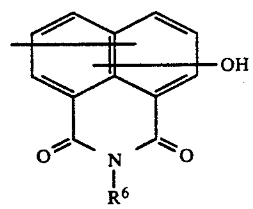

wherein $R^4$ is a hydroxyl group, a group represented by $—NR^{10}R^{11}$ (wherein $R^{10}$ and $R^{11}$ are the same or different from each other and respectively are a hydrogen atom or an alkyl group), or a group represented by $—NHSO_2R^{12}$ (wherein $R^{12}$ is a hydrogen atom, an alkyl group, an alkenyl group or an aryl group);

$R^5$ is a halogen atom, a carboxyl group or a sulfamoyl group;

$R^6$ is an atomic group necessary for the formation of an aromatic ring, an aliphatic ring or a heterocyclic ring in condensation with a benzene ring having $R^4$ and $R^5$;

$R^8$ is a hydrogen atom, an alkyl group or an aryl group; and $R^9$ is a phenylene group or a naphthylene group.

16. An electrophotographic photosensitive member according to claim 12, wherein the coupler residue A is one selected from the group consisting of groups represented by the following general formulas C1, C2, C3, C4, D1, D2 and D3:

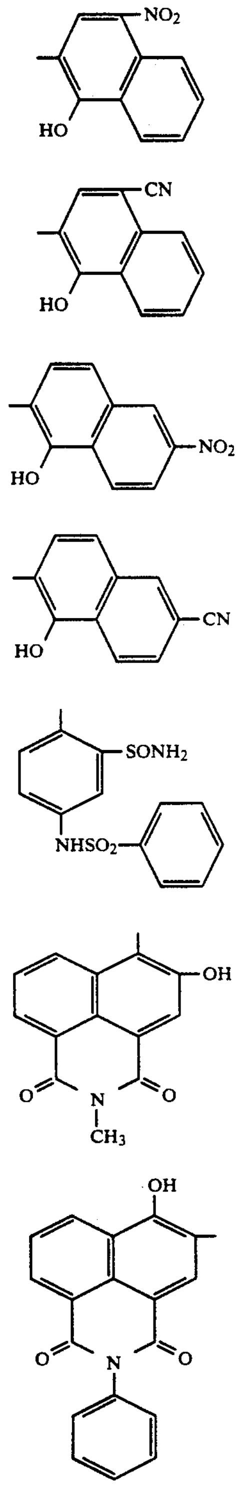

17. An electrophotographic photosensitive member comprising a conductive substrate and a photosensitive layer deposited on the conductive substrate, wherein the photosensitive layer comprises a charge generating material and a charge transporting material;

the charge generating material comprising an azo compound having a diphenoquinone structure selected from the group consisting of structures represented by the following general formulae IIA, IIB and IIC:

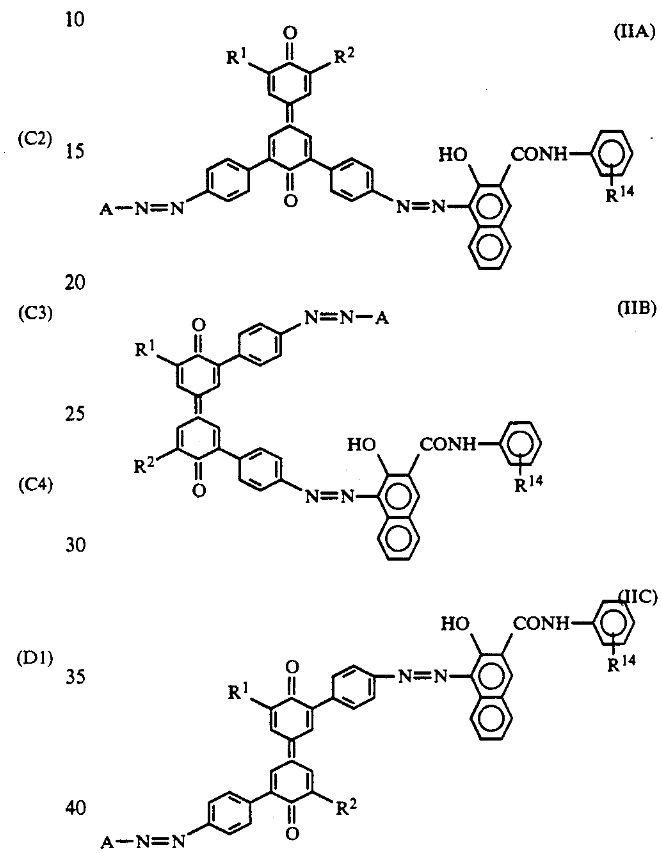

wherein $R^1$ and $R^2$ are the same or different from each other and are a hydrogen atom, an akyl group, an alkenyl group, a hydroxyl group, an alkoxy group, a carboxy group, an alkoxy carbonyl group, an acyl group, an aryl group, a halogen group or a cyano group, respectively; $R^{14}$ is a hydrogen atom, a halogen group, an alkyl group, an alkoxy group, an aryl group, an amino group, a cyano group, a nitro group or a sulfoxide group; and A is a coupler residue having an acceptor property.

18. An electrophotographic photosensitive member according to claim 17, wherein the photosensitive layer is of a single-layered structure comprising a charge generating material, a charge transporting material and a binder resin.

19. An electrophotographic photosensitive member according to claim 17, wherein the photosensitive layer is of a multilayered structure comprising a charge generating layer including the charge generating material and a binder resin, and a charge transporting layer including the charge transporting material and a binder resin.

20. An electrophotographic photosensitive member according to claim 17, wherein the coupler residue A having an acceptor property is one selected from the group consisting of groups represented by the following general formulas a through f:

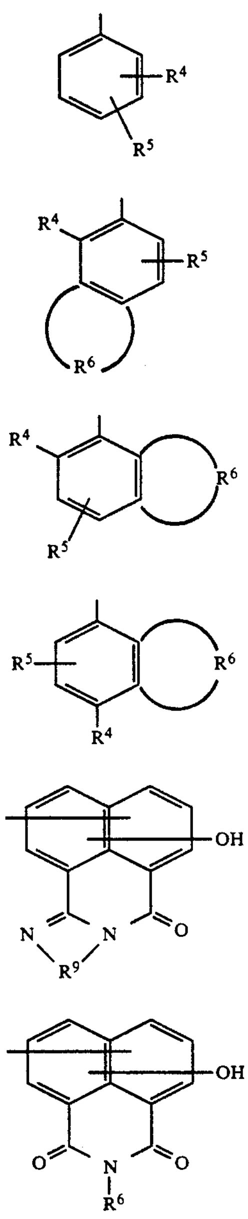

wherein $R^4$ is a hydroxyl group, a group represented by $-NR^{10}R^{11}$ are the same or different from each other and respectively are a hydrogen atom or an alkyl group), or a group represented by $-NHSO_2R^{12}$ (wherein $R^{12}$ is a hydrogen atom, an alkyl group, an alkenyl group or an aryl group);

$R^5$ is a halogen atom, a carboxyl group or a sulfamoyl group;

$R^6$ is an atomic group necessary for the formation of an aromatic ring, an aliphatic ring or a heterocyclic ring in condensation with a benzene ring having $R^4$ and $R^5$;

$R^8$ is a hydrogen atom, an alkyl group or an aryl group; and $R^9$ is a phenylene group or a naphthylene group.

21. An electrophotographic photosensitive member according to claim 17, wherein the coupler residue A is one selected from the group consisting of groups represented by the following general formulas C1, C2, C3, C4 D1, D2 and D3:

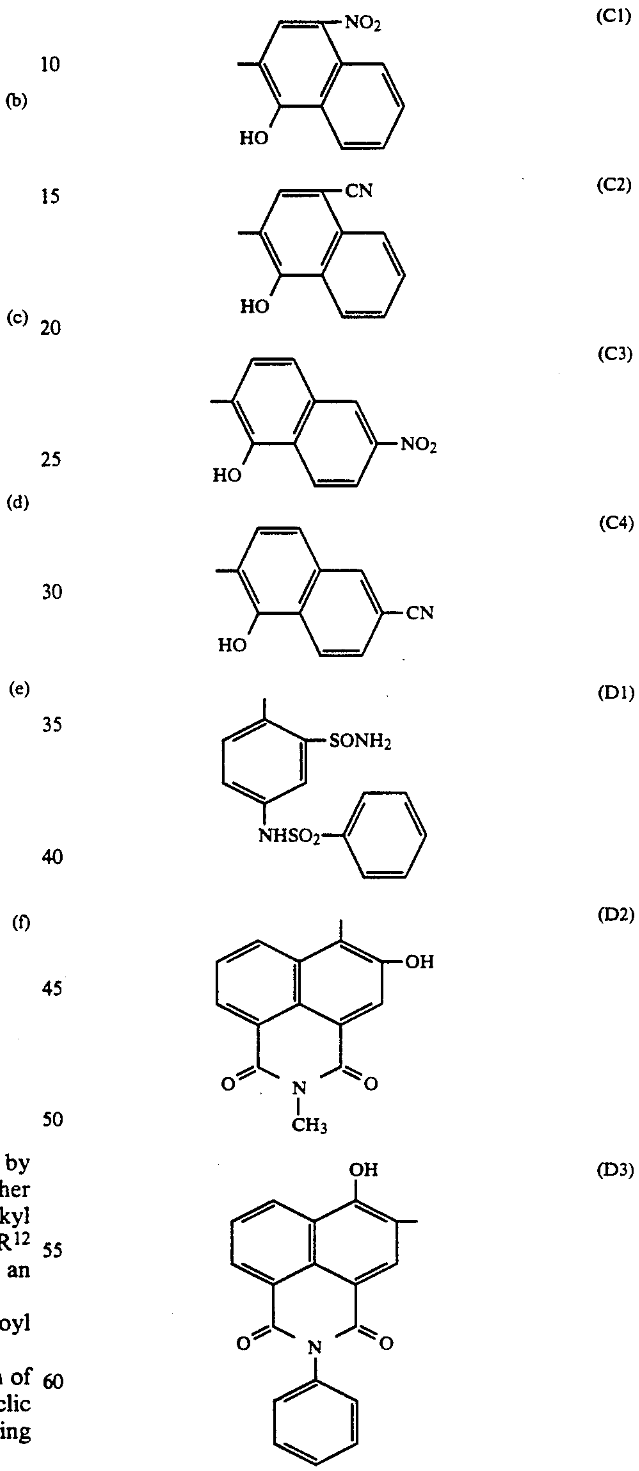

* * * * *